Oct. 31, 1933.  G. M. BELLANCA  1,933,001
AIRPLANE CONSTRUCTION
Filed Nov. 8, 1930     2 Sheets-Sheet 1
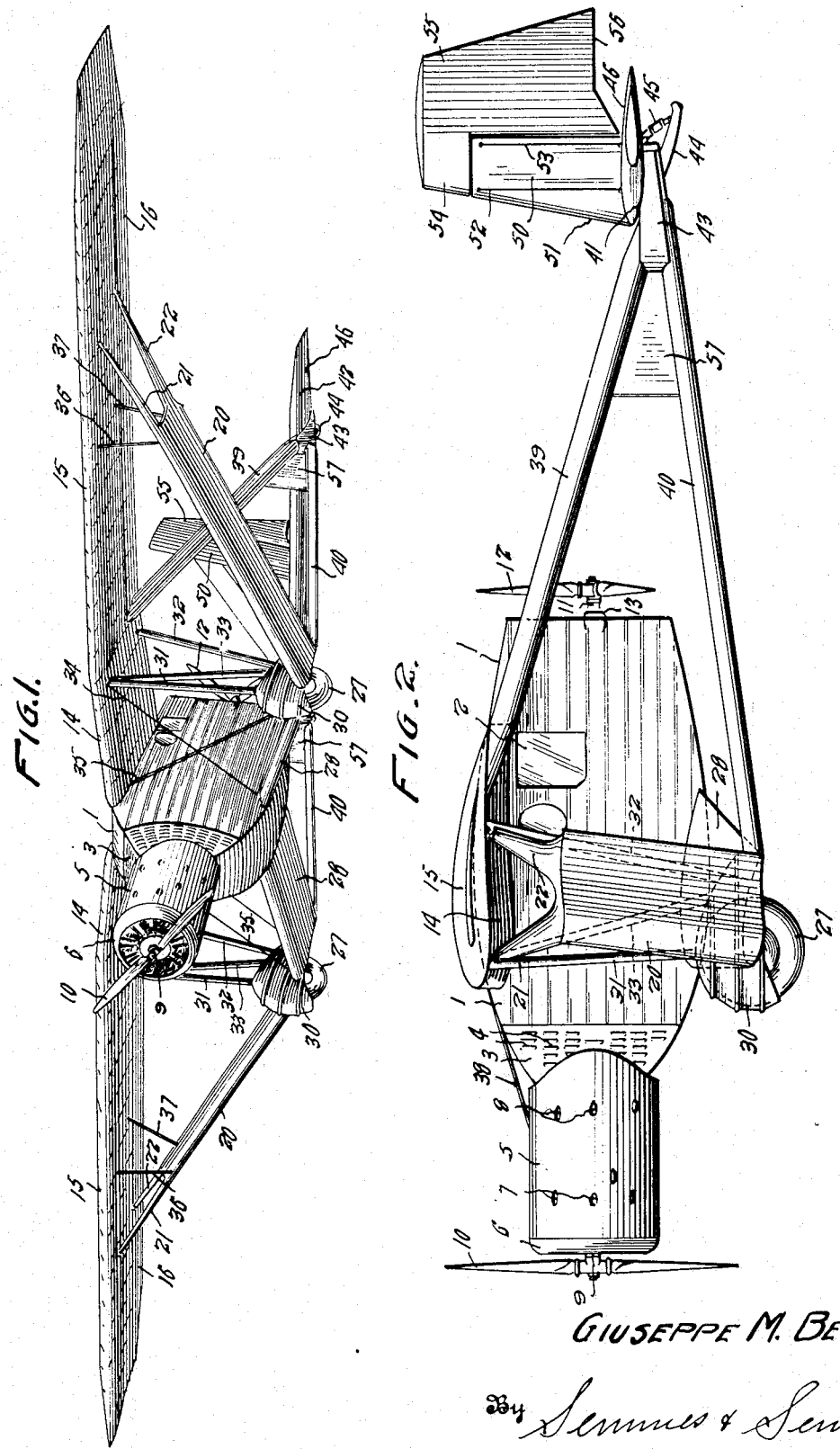
Inventor
GIUSEPPE M. BELLANCA
By Semmes & Semmes
Attorneys

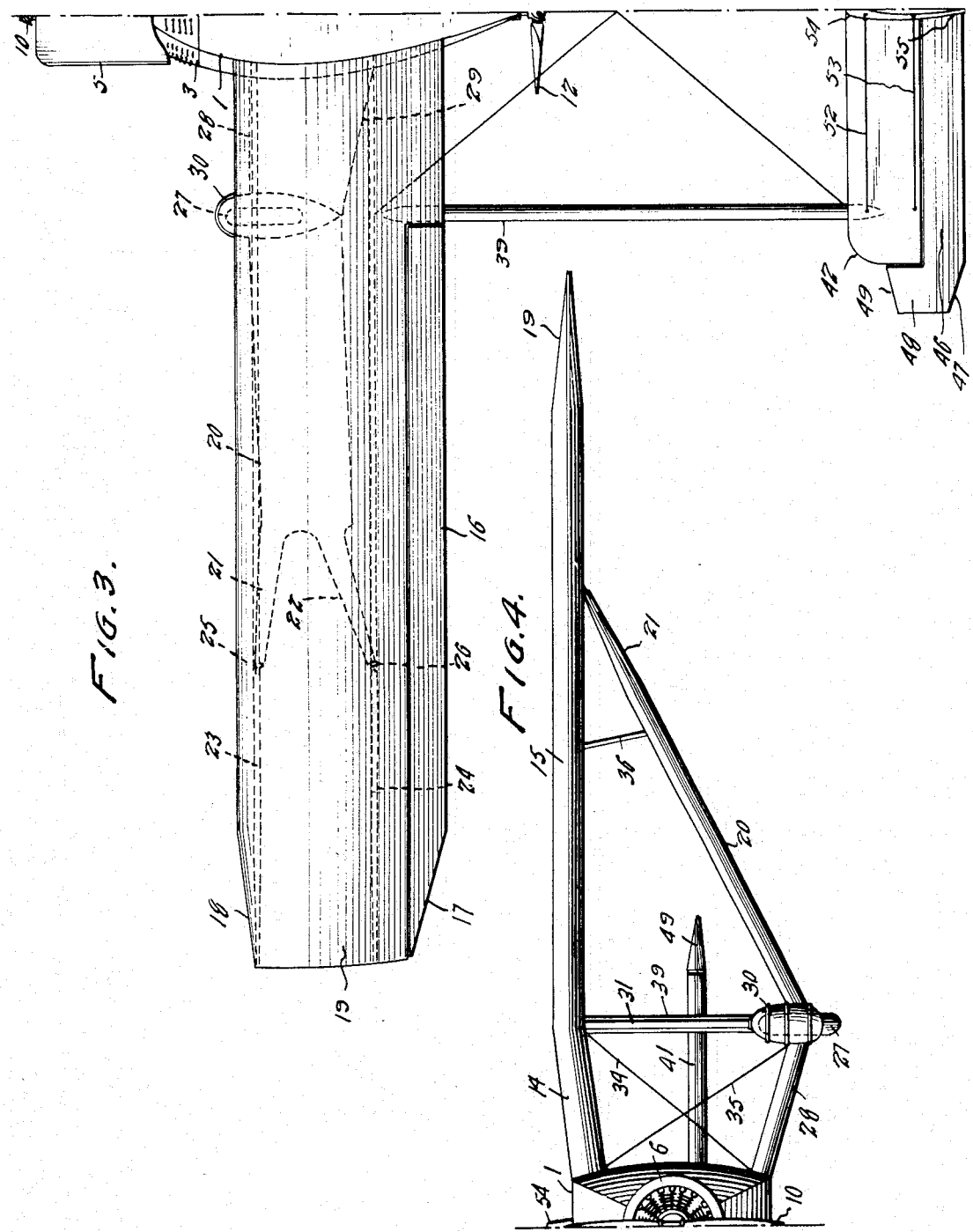

Patented Oct. 31, 1933

1,933,001

UNITED STATES PATENT OFFICE 1,933,001

AIRPLANE CONSTRUCTION

Giuseppe M. Bellanca, New Castle, Del.

Application November 8, 1930. Serial No. 494,364

18 Claims. (Cl. 244—12)

This invention relates in general to heavier than air craft, and more particularly has reference to a novel design for airplanes.

The present invention contemplates a radical departure from the current airplane designs, wherein a single motor is usually mounted in the nose of the fuselage which is continuous with the tail assembly. For practical purposes there are two general types of aircraft, namely, monoplanes and biplanes. Monoplane constructions have been largely adapted in the manufacture of large transport planes, with the exception of military bombers.

It is still generally recognized, however, that the biplane possesses greater maneuverability and is more stable than the monoplane, although the same have been to some degree discarded in favor of the large monoplanes, particularly by reason of the simplification of construction. This has been principally due to the fact that heretofore it has been inconvenient to mount more than a single motor on a biplane, as the mounting of the same has required such a great additional strength in the wing structure as to make the adoption of a monoplane construction more desirable.

In the present day monoplanes carry a plurality of motors, the same are usually suspended under the wing on each side of the fuselage, which may carry a third motor in the nose, and also motors have been mounted on top of the wing, as well as above a fuselage suspended from a wing. In some instances of this character of mounting, a nacelle has been substituted for the fuselage, and the tail assembly carried on outriggers.

The general purpose of any airplane construction, particularly in large aircraft is the inclusion of one or more motors capable of developing the necessary horse power with a minimum increase in weight and resistance in the airplane. Safety, however, is the principal consideration in practically all of the present day constructions, and great sacrifices are necessarily made in perfecting a design in order to obtain an inherently stable structure.

In large aircraft, it is usually essential to employ a plurality of motors, although in some instances a single power plant might be sufficient. The advantages of a pair or more of motors are obvious in that an airplane may be sustained in flight with the failure of one or more of the power plants if the remainder are capable of developing sufficient horse power, to maintain the plane in flight. In large designs, requiring a number of motors, it is desirable to equip the airplane with additional reserve power capable of sustaining the plane, so that in a similar manner in the event of partial motor failure flight may nevertheless be continued.

It has long been recognized, as is evident from the present day constructions, that in an airplane powered by a single motor, the most desirable and effective mounting for the power plant is in the nose of the fuselage. In large types of planes requiring additional power plants, motors have been customarily mounted, as has previously been stated, on each side of the fuselage under the wing or above the same, as well as in the nose of the fuselage, or mounted between the wing and a suspended fuselage or nacelle.

It will be appreciated that in designs of this character, that there is a wide distribution of weight by reason of the separation of the power plants, particularly if the fuselage or nacelle is suspended from the wing, and the resistance of such airplanes has necessarily been greatly increased by the head resistance of a plurality of motors.

The mounting of the motors on each side of the fuselage, as is common practice in large planes adds very materially to resistance, reducing the speed, and with the failure of one of the motors, the plane naturally becomes wing heavy, even if there is an additional motor on the nose of the fuselage, requiring an aileron setting to compensate for the dead motor. The same disadvantages attend such an airplane if the motors cannot be run at the same speed, and in the event of an unexpected motor failure the plane may be caused to rotate on its longitudinal axis at such a degree as to fall into a slip, which may result in a spin attended by disastrous consequences.

In summing up the disadvantages which have attended the mounting of motors in past aircraft construction, it may be stated that in including more than one motor that the same necessarily by reason of accepted aircraft design, have been mounted off the longitudinal center of balance of the airplane.

Although it has long been recognized that the effectiveness and safety of an airplane is increased by as great a centering of the weight as possible, previous aircraft design has not permitted mounting of more than one motor whereby the weight of the same might be centered on the longitudinal center of balance of the airplane. The mounting of motors on or under the wings has also necessitated a stronger wing construction adding to the weight and thus decreasing the effectiveness.

The general types of air foils generally used on present day aircraft have already been discussed, smaller types of planes being of biplane construction, and the larger types of monoplane design. Where safety is the major factor such as in large transport craft either of these types of air foils have been recognized to possess certain fundamental disadvantages. The greatest danger attending normal flight is a stall which usually results in a spin, the plane first, however, falling into a slip. In either a monoplane or biplane having horizontally arranged wings, recovery from a slip is dependent on forward velocity as is air speed is lost, a spin will result, which at a low altitude will usually prove disastrous.

The present invention contemplates a radical departure from the current designs of modern aircraft in which a plurality of motors may be mounted on the longitudinal center of balance of the airplane, and in the provision of a new type of fuselage, and air foils arranged to act in conjunction with a novel tail assembly to provide an airplane inherently stable in flight, offering a minimum of resistance and capable of being sustained without change in the longitudinal or lateral center of balance with failure of one of the motors.

An object of this invention is to provide an airplane having a plurality of motors mounted on the longitudinal center of balance of the airplane.

Another object of this invention is to provide an airplane driven by tractor and pusher propellers and rotating on the longitudinal center of balance of the airplane.

Still another object of this invention is to provide an airplane having horizontal top wing sections attached to angularly disposed center wing sections.

Still another object of this invention is to provide an airplane having lower stub wing sections angularly disposed with respect to the horizontal.

Still another object of this invention is to provide an airplane having angularly disposed lift struts reinforcing the mounting of the top wing.

Still another object of this invention is to provide an airplane having the landing gear mounted between the outer and lower ends of stub wings and lift struts, respectively.

Still another object of this invention is to provide an airplane having the landing gear supported on upper and lower air foils.

Still another object of this invention is to provide an airplane having the mounting of the top wing reinforced by lift struts formed at the upper ends to eliminate interference thereof with air currents passing under the wing.

Still another object of this invention is to provide an airplane having the fuselage terminating adjacent the trailing edge of the wing.

A further object of this invention is to provide an airplane having a fuselage terminating adjacent the trailing edge of the wing with a pusher propeller operating in the rear thereof.

Still another object of this invention is to provide an airplane having a plurality of motors mounted in tandem in the nose of the fuselage.

Still another object of this invention is to provide an airplane having a plurality of motors mounted on the nose of the fuselage for driving tractor and pusher propellers on the nose and on the rear of the fuselage, respectively.

Still another object of this invention is to provide an airplane having a plurality of motors mounted in tandem on the nose of the fuselage under a cowling permitting cooling of both motors.

Still another object of this invention is to provide an airplane having a fuselage substantially twice as high as wide, streamlined in the front and terminating in a cowling and tapering on the sides to an edge in the rear.

A further object of this invention is to provide an airplane having a fuselage terminating adjacent the trailing edge of the wing with a tail assembly in the rear thereof carried on outriggers.

A still further object of this invention is to provide an airplane having a fuselage terminating adjacent the edge of the wing with the tail assembly carried on outriggers attached to the main and stub wings.

A still further object of this invention is to provide an airplane having a fuselage terminating adjacent the trailing edge of the wing with a tail assembly carried on outriggers provided with vertical stabilizing fins.

In the drawings forming a part of this specification:

Figure 1 is a perspective view of an airplane constructed in accordance with my novel design.

Figure 2 is a side elevational view of the airplane.

Figure 3 is a top view of the airplane on one side of its longitudinal axis.

Figure 4 is a front view of the airplane on one side of its longitudinal axis.

Referring more particularly by numerals to the drawings, the airplane constructed in accordance with my novel design comprises a fuselage 1, substantially twice as high as wide, having curved flat top and bottom surfaces forming a streamlined head. The greatest width of the fuselage is at substantially one-third of its length from the nose, the remaining two-thirds tapering to a point at the rear. The side surfaces of the fuselage are rounded, and similarly of greatest width at substantially one-third the length from the front, tapering to a point at the nose, but slightly tapering to a vertical edge in the rear forming the termination of the fuselage.

The fuselage is divided into compartments, the front portion being adapted to receive a fuel tank and the upper rear portion is designed to serve as a cockpit with windows 2 to allow vision. The central portion of the lower section is adapted to receive a lubricant tank, while the rear portion of the lower section is fitted for a baggage compartment.

The nose of the fuselage is formed of a cowling 3 having a series of baffled ventilators 4 provided therein. A pair of motors are mounted in tandem on the nose, enclosed by a tubular cowling 5. The cowling 5 is formed with a rounded rim 6, and two series of peripheral apertures 7 and 8 to allow exit of air to pass around through the front pair of motors.

The front motor is adapted to drive a shaft 9 having mounted thereon a twin blade tractor propeller 10 operating in front of the rounded portion 6 of the cowling 5.

The rear motor is adapted to drive a shaft 11 extending through the central portion of the fuselage, having triple bladed pusher propeller 12 mounted thereon. The shaft 11 is adapted to extend through a sleeve provided in the fuel compartment and under the floor of the operating compartment and above the lubricant tank, and is mounted in the central portion of the rear edge of the fuselage in a bearing 13 adapted to take the direct thrust on the shaft.

It will thus be seen that a plurality of motors are mounted substantially coincident with the longitudinal axis of the fuselage, operating tractor and pusher propellers in the front and rear of the fuselage, respectively.

A pair of top center wing sections 14 are mounted on the sides of the fuselage adjacent the top edge. The trailing edge of the wing sections extend below the top edge of the fuselage. A pair of main wings 15 are attached to the ends of the center wing section 14, which are angularly mounted with respect to the fuselage, the main wing section 15, however, being substantially horizontally mounted.

The main wing sections are provided with ailerons 16, extending along the entire trailing edge thereof, and tapered at the outer ends as at 17. The outer ends are also correspondingly tapered as at 18, and the tops and bottoms of the main wing sections are tapered at the outer ends as at 19, as shown in Figure 4.

The mounting of the main wing sections 15 on the center sections 14 is reinforced by lift struts 20. These struts are constructed as air foils, and the tops thereof are connected to the underside of the main wing sections by spars 21 and 22 on the top ends thereof forming continuations of the spars in the leading and trailing edges of the struts, but angularly arranged with respect thereto, suitably covered and streamlined in the same manner as the struts, and connected to spars 23 and 24 in the wing as shown in plan in Figure 3, by suitable fastening devices 25 and 26. As clearly shown, the lift struts 20, constructed as airfoils, are of constant cord and thickness.

The lower ends of the struts 20 are connected to the outer ends of axles (not shown), carrying landing wheels 27, the inner ends of which are mounted in the extremities of stub wings 28 outwardly tapered along the trailing edge as shown in plan in Figure 3 at 29.

The inner ends of the stub wing sections are attached to the sides of the fuselage adjacent the lower edges thereof, and angularly positioned with respect thereto at an angle substantially opposite to that at which the top center wing sections are mounted.

A casing 30, enclosing the top of each landing wheel is mounted between the lower ends of the lift struts and the extremities of the stub wing sections and centrally supported on the axles carrying the wheels. The tops of the casings 30, above the axle are connected to the underside of the center wing sections adjacent the leading edges and extremities thereof by streamlined struts 31, and the rear of the casings, similarly connected to the underside of the center wing sections adjacent the trailing edges thereof by struts 32. The connection of the casing to the center wing sections by struts 30 and 32 is reinforced by cross struts 33, connected in the underside of the center wing sections adjacent the top of the struts 31 and to the rear of the casing 30, adjacent the bottoms of the struts 32. The mounting of the top center wing sections and lower stub wing sections is further reinforced by a series of cross guy wires 34 and 35.

The mounting of the lift struts on the underside of the main wing sections is reinforced by cross bars 36 and 37 connected between the underside of the main wing sections adjacent the leading and trailing edges thereof and on the tops of the lift struts adjacent the ends. A plurality of cables 38, suitably anchored in the fuselage are secured on the motor mounting and extend between the nose of the fuselage and the cowling 5, adapted to lend support to the motors.

The tail unit of the airplane is carried by the top center and lower stub wing sections, on top and bottom spars 39 and 40 connected at the joints between the extremities of the center and main wing sections, and the lower stub wings of the wing struts, respectively.

The tail unit consists of a horizontal stabilizer 41 having the front side edges rounded as at 42, and mounted on extensions 43 as shown in Figure 2 connecting the top and bottom pairs of struts forming outriggers. The horizontal fin is continuous and extends over on each side of the parallelly arranged struts and beyond the points in a plane with the stub and center wing sections, lying in substantially the same plane as the inner ends of the stub wing sections.

Tail skids 44 are mounted on the members 43 connecting the top and bottom struts at the termination thereof, the ends being connected to the members by springs 45. An elevator fin 46 is pivoted on the trailing edge of the horizontal stabilizing fin, the rear edges of the outer ends being tapered as at 47 and the ends extending over points past the pivoting as at 48, and tapered at the extremities as at 49.

A vertical stabilizing fin 50, having a leading edge tapered downwardly as at 51 is centrally mounted on the center portions of the horizontal stabilizing fin and the mounting reinforced by guy wires 52 and 53. A rudder 54 is pivoted on the trailing edge of the vertical stabilizing fin having a forward portion 55 extending over the top thereof, and forming a continuation of the vertical stabilizing fin when centrally positioned. The bottom of the rudder is cut away as at 56 to allow movement of the elevator without interfering with the action thereof. The top of the rudder extends at a point above a point in a plane with the top center wing sections.

Supplemental vertical stabilizing fins 57 are mounted between the top and bottom pairs of spars 39 and 40, lying in a point substantially in a plane with the extremities of the stub wings 27.

The advantages attending an airplane constructed in accordance with my design will be apparent. In the mounting of a pair of motors in the nose of an airplane fuselage, the weight of the same is centered, and the air resistance of the airplane reduced. The cowling enclosing the motor is provided with ventilators arranged to efficiently cool the motor, and the cowling is formed and fitted on the nose of the fuselage in such a manner that in conjunction with the form of the fuselage, a desirable streamlined structure is afforded.

The fuselage is constructed substantially twice as high as wide, terminating adjacent the trailing edge of the wing, the nose and tail of the fuselage projecting at substantially the same distance from each side of the leading and trailing edges of the wing. This type of fuselage provides for a double deck arrangement, affording a maximum carrying capacity with a minimum of resistance due to the form and streamlining of the same.

Inasmuch as the fuselage terminates adjacent the trailing edge of the wing, a pusher propeller may be carried on the rear of the fuselage in addition to the tractor propeller on the nose. The pusher propeller is driven with a rear motor on the nose through a shaft extending through the fuselage between the compartments, and thus no weight is carried in the rear of the operating compartment which might endanger the life of the pilot in the event of an accident.

In constructing the wing in sections, the rigid type of piecing is made possible, and by supporting the landing wheels between the stub and lift strut wing sections, the shock of landing may be distributed among the several air foils by reason of the connection of the axles carrying the wheels with the main wing, and in addition this mounting of the landing wheels offered considerable less resistance than has heretofore been obtainable in other than retractable landing wheels.

The angular disposition of the center and stub wing sections and lift struts allows for a rigid bracing, as has already been mentioned, and in addition increases the lateral as well as longitudinal stability of the airplane in flight by reason of the opposed forces set up thereby. In the mounting of the pusher propeller at the rear of the fuselage, the slip stream therefrom is directed on the control surfaces in the air unit, thus providing for an increase in responsiveness to the controls. In substituting outriggers for carrying the tail assembly in place of the usual continuous fuselage, shocks on the tail unit are transmitted to the air foils in the same manner as the shocks on the landing wheel, and it is also possible to mount additional vertical fins to stabilize the flight of the airplane.

The ailerons extend the entire length of the main wing sections, and the horizontal fin and elevator on the tail unit extend over each side of a point in a plane with the landing wheels. The rudder extends above a point in a plane with the nose of the fuselage, and in the provision of these extensive control surfaces ready maneuverability is assured.

There is accomplished by this invention an airplane carrying a plurality of motors the weight of which is centered in substantial alignment with the longitudinal axis of the airplane, which is provided with angularly disposed air foils, adding to the stability thereof and allowing for secure bracing, in which the shocks incident to landing and taking off are distributed over the wing surfaces generally, and in which ready control is afforded by reason of extensive control surfaces directly in the slip stream of the pusher propeller, but out of interference therewith.

While I have shown and described the preferred embodiment of my invention, I wish it to be understood that I do not confine myself to the precise details of construction herein set forth by way of illustration, as it is apparent that many changes and variations may be made therein, by those skilled in the art without departing from the spirit of the invention, or exceeding the scope of the appended claims.

I claim:

1. An airplane comprising a fuselage, top and bottom wing sections, upwardly and downwardly extending and connected to the upper and lower portions of the fuselage, respectively, the top wing section terminating in a horizontal wing section, and the bottom wing section being connected to the horizontal top wing sections by lift struts through wheel casings.

2. An airplane comprising center and stub wing sections, and a fuselage terminating adjacent the trailing edges thereof, and a tail assembly carried in the rear of the fuselage connected by outriggers to the extremities of the stub and center wing sections.

3. An airplane comprising a fuselage, a main wing, a stub wing, a strut having an airfoil surface extending from said stub wing to said main wing and a landing wheel mounted between the stub wing and the strut in the horizontal plane thereof.

4. An airplane comprising a fuselage, a main wing, a stub wing, a strut having an airfoil surface extending from said stub wing to said main wing, a landing wheel mounted between the stub wing and the strut in the horizontal plane of the stub wing, and a casing of stream lined section enclosing the greater portion of said landing wheel.

5. An airplane comprising a fuselage, top wing sections connected to the upper portion thereof, bottom stub wing sections connected to the lower portion thereof, the top and bottom wing sections being relatively angularly positioned with respect to the horizontal, means to connect the top and bottom wing sections, and angularly arranged strut wings of constant cord and thickness connected to the stub wing and top wing sections.

6. An airplane comprising center and stub wing sections, and a fuselage terminating adjacent the trailing edges thereof, and a tail assembly carried in the rear of the fuselage connected by outriggers to the extremities of the stub and center wing sections, said tail assembly having a horizontal stabilizer with a span greater than the center and stub wing sections.

7. An airplane comprising center and stub wing sections, and a fuselage terminating adjacent the trailing edges thereof, and a tail assembly carried in the rear of the fuselage connected by outriggers to the extremities of the stub and center wing sections, said tail assembly having a horizontal stabilizer with a span greater than that of the stub wing.

8. An airplane comprising center and stub wing sections, and a fuselage terminating adjacent the trailing edges thereof, and a tail assembly carried in the rear of the fuselage connected by outriggers to the extremities of the stub and center wing sections, said tail assembly having a rudder extending above the center wing section.

9. An airplane comprising a wing and a fuselage terminating adjacent the trailing edge thereof, a tail assembly carried in the rear of the fuselage connected by outriggers to the wing with vertical stabilizing fins mounted therebetween, and supplemental vertical stabilizing fins carried by the outriggers.

10. An airplane comprising a fuselage, a top wing section having a section of lateral dihedral and a horizontal section, a stub wing, a lift strut connecting said stub wing and the horizontal section of the top wing, and a landing wheel mounted between the stub wing and the lift strut at the juncture thereof in the plane of the joint between the dihedral and the horizontal sections.

11. An airplane comprising a fuselage, a top wing section having a section of lateral dihedral and a horizontal section, a stub wing, a lift strut connecting said stub wing and the horizontal section of the top wing, a landing wheel mounted between the stub wing and the lift strut at the juncture thereof in the plane of the joint between the dihedral and the horizontal sections, and a casing enclosing the majority of the landing wheel.

12. An airplane comprising a fuselage, a top wing having a section of lateral dihedral and a horizontal section, a landing wheel in the plane of the joint between the dihedral and the horizontal sections, and a tail assembly carried in the rear of the fuselage connected by outriggers to the joint of the dihedral and horizontal sections of the top wing.

13. An airplane comprising a fuselage, a top wing section having a section of lateral dihedral and a horizontal section, a stub wing, a lift strut connecting said stub wing and the horizontal section of the top wing, a landing wheel mounted between the stub wing and the lift strut in the plane of the joint between the dihedral and the horizontal sections, and a tail assembly carried in the rear of the fuselage by outriggers connected to the joint of the dihedral and horizontal sections of the top wing and to the joint of the stub wing and lift strut.

14. An airplane comprising a main wing section and a fuselage, a tail assembly carried in the rear of the fuselage and connected by outriggers to the main wing, said tail assembly having a rudder extending from a plane including the center of said fuselage above the main wing section.

15. An airplane comprising a fuselage, a main wing section, strut members extending from said fuselage to the main wing section, a tail assembly carried in the rear of the fuselage outriggers connected to the trailing edge of the main wing and to the trailing edge of said strut members, said tail assembly terminating rearwardly of the fuselage.

16. An airplane comprising a fuselage, a main wing section, strut members extending from said fuselage to the main wing section, compression members between the main wing and the strut members, a tail assembly carried in the rear of the fuselage by outriggers to the main wing, said outriggers being connected to the main wing in the plane of said compression members, said tail assembly terminating rearwardly of the fuselage.

17. An airplane comprising a fuselage, a main wing section, strut members extending from said fuselage to the main wing section, a tail assembly carried in the rear of the fuselage, outriggers connected at one end to the tail assembly and to the other to the trailing edge of the main wing and directly to said strut member, said tail assembly terminating rearwardly of the fuselage and having a rudder extending above the main wing section.

18. An airplane comprising a fuselage, a main wing section, strut members extending from said fuselage to the main wing section, a tail assembly carried in the rear of the fuselage outriggers attached to the tail assembly at one end and at the other end to the main wing and said strut members, said tail assembly terminating rearwardly of the fuselage and having a rudder extending above the main wing section and tension cables supporting said outriggers.

GIUSEPPE M. BELLANCA.